June 1, 1965 J. M. FORBES 3,186,497
LAND PACKER
Filed Dec. 24, 1962 4 Sheets-Sheet 1
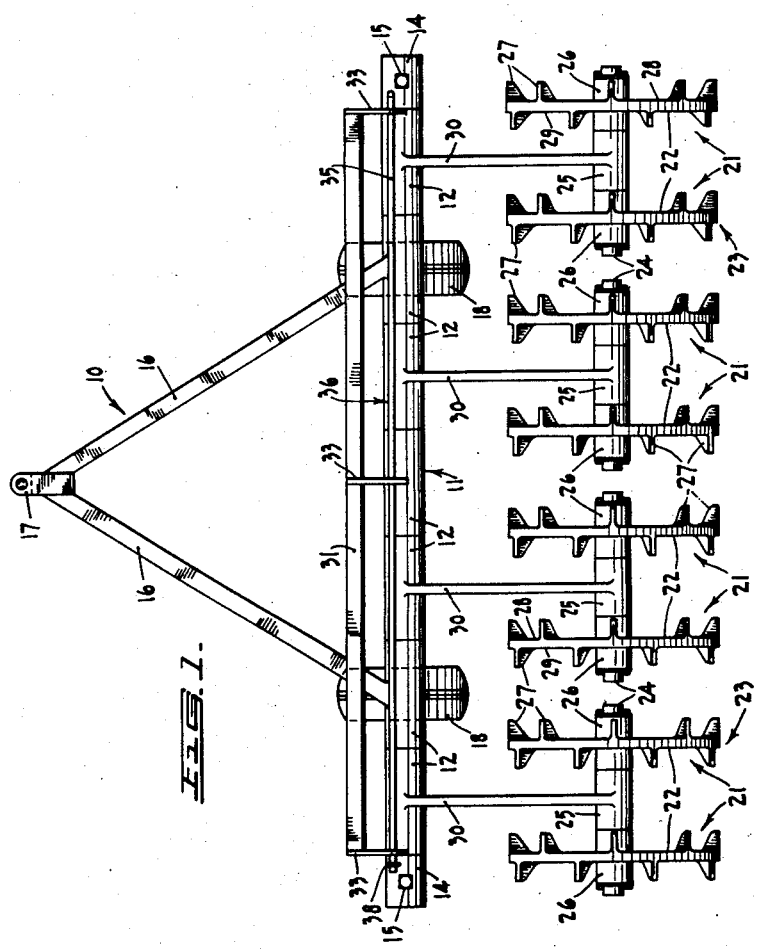

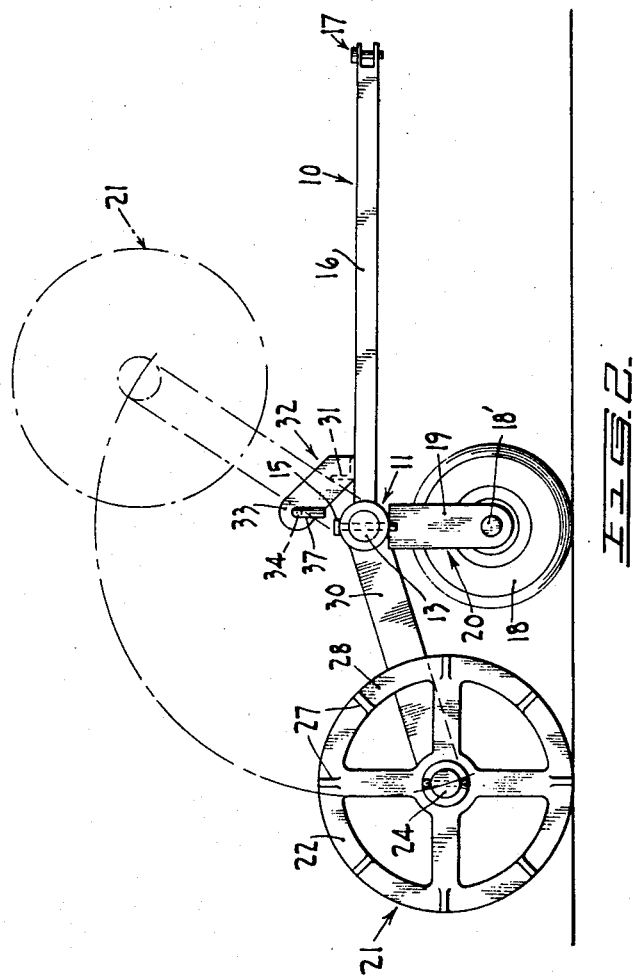

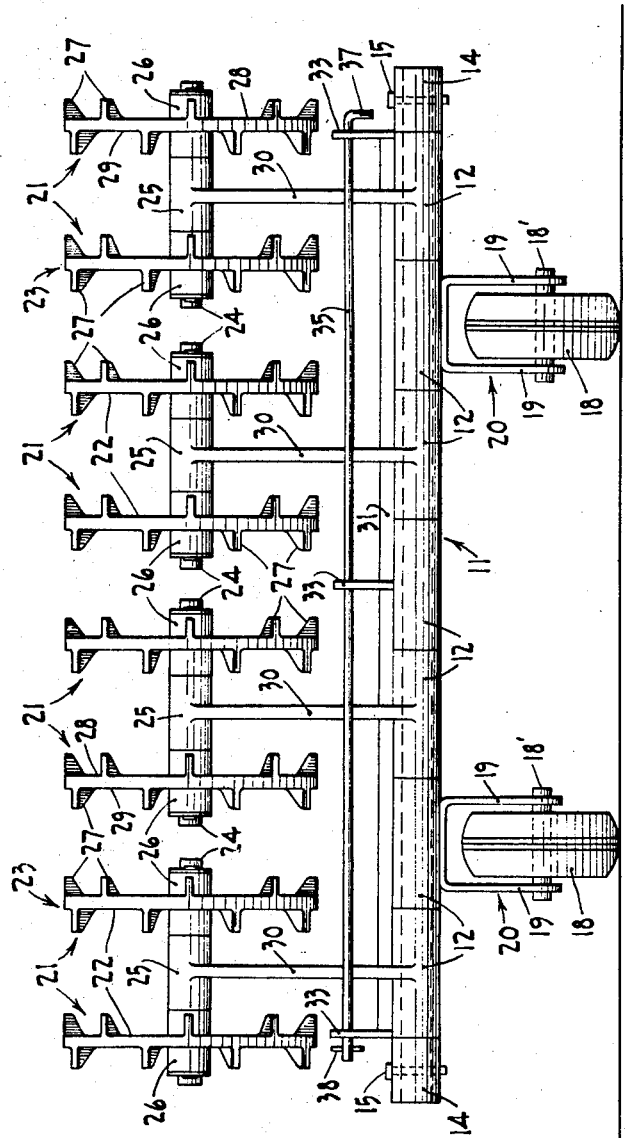

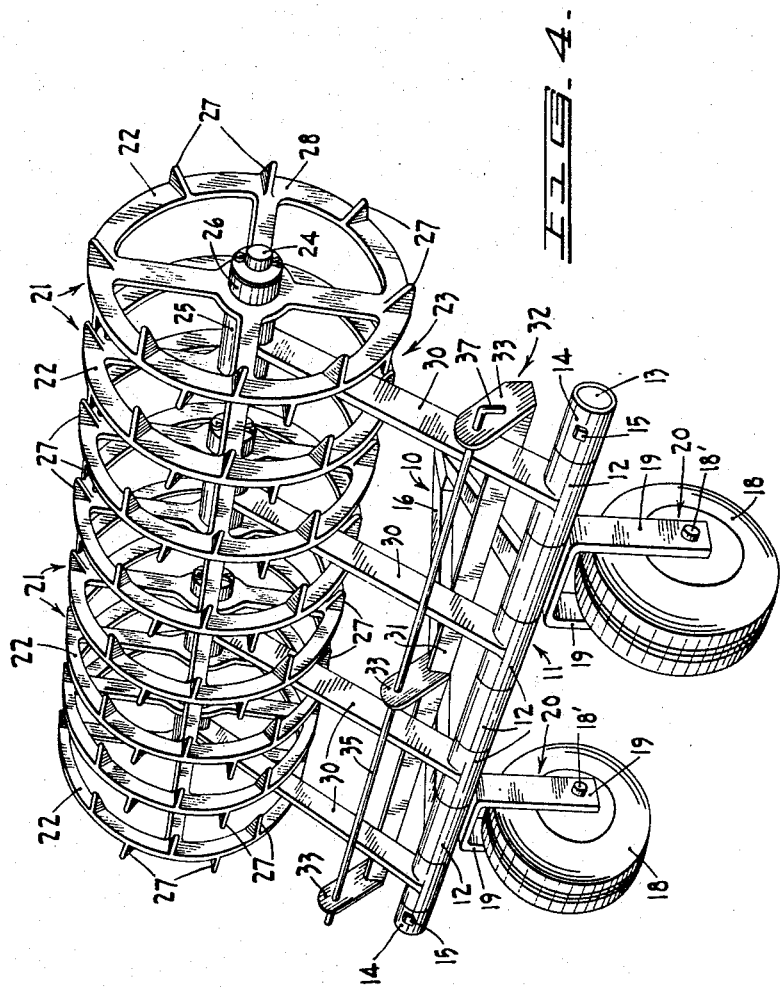

United States Patent Office 3,186,497
Patented June 1, 1965

3,186,497
LAND PACKER
John M. Forbes, 843 11th St. W., Saskatoon,
Saskatchewan, Canada
Filed Dec. 24, 1962, Ser. No. 246,789
6 Claims. (Cl. 172—548)

This invention relates to a land packer intended primarily for agricultural use.

Land packers have been widely used in agricultural operations. The majority of land packers in use have been constructed with packing wheels all mounted for rotation about a single main shaft. Land packers of this type do not pack the land in depressions narrower than the width of the main shaft and furthermore when a ridge or stone is encountered, all the packing wheels will be raised out of contact with the land, except those in contact with the ridge or stone so that again some areas are not packed.

Other land packers have been constructed with two or more cylindrical rollers disposed in end to end relationship and trailing behind a tow bar. Land packed by such rollers is smooth and does not control soil drifting, nor does the land hold and preserve moisture.

Another difficulty with the land packers heretofore used is that they are not adapted to be readily transported from one place to another. When transportation involves travelling over hard surfaces, such as a paved road, it must be done slowly or the land packer must be transported on a carrier vehicle.

It has been found that these difficulties may be largely overcome by providing a land packer having several packing members, each of which is pivotally attached to a towing frame so that each member packs separately from the others and is free to follow the contours of the ground, and so that each member can be raised to an elevated position during transportation of the packer from one place to another. Furthermore, laterally projecting lugs provided adjacent the peripheral edges of the packing members will break up lumps of earth and make an irregular land surface which will tend to control soil drifting and which will hold moisture.

A land packer in accordance with the present invention comprises a towing frame mounted on a pair of supporting wheels, a plurality of packing members, and means whereby the packing members when raised to an elevated position relative to said frame for transportation purposes are readily retained in such elevated position, said frame including a tow bar, each of said packing members being rotatably mounted on at least one trailing arm extending rearwardly and transversely from said tow bar, each of said trailing arms being pivotally attached to said tow bar whereby each of said packing members is mounted for pivotal movement about the longitudinal axis of the tow bar independently of the other packing members.

In drawings which illustrate an embodiment of the invention:

FIGURE 1 is a plan view of this embodiment;

FIGURE 2 is a side elevation view of this embodiment, on enlarged scale;

FIGURE 3 is a rear elevation view of this embodiment on the enlarged scale of FIGURE 2 with the land packing members in elevated position; and FIGURE 4 is a perspective view of this embodiment on a further enlarged scale with the land packing members in elevated position.

The land packer illustrated comprises a towing frame 10 which includes a tow bar 11. The tow bar 11 comprises a plurality of sleeves 12 disposed in end to end relationship about a shaft 13. The sleeves 12 are free to rotate about the shaft 13 and are restrained from sliding movement therealong by end sleeve portions 14 secured to the shaft 13 by the pins 15.

A pair of arms 16, each of which is secured at one end to a selected sleeve 12, extend forwardly of the tow bar 11 and converge to a point of intersection where a pin and eye hitching joint 17 is positioned. The joint 17 is such that when connected to a towing vehicle, the frame 10 will be free to pivot horizontally about the connection.

The frame 10 is carried on a pair of wheels 18 each of which is mounted for rotation about an axle 18' secured between the downwardly extending legs 19 of a wheel supporting bracket 20 (see FIGURE 3) of inverted U-shape fast with the underside of a selected sleeve 12.

A plurality of packing wheels 21, each of which comprises an annular disc 22 mounted for rotation about its central axis, are operatively positioned rearwardly of the tow bar 11. The wheels 21 are associated in pairs to form packing members 23 (see FIGURE 1). Each of the wheels 21 of each of the packing members 23 is independently mounted for rotation about and associated axle 24. The wheels 21 of each packing member 23 are maintained in spaced apart relationship by a roller bearing 25 (see FIGURE 1) rotatably disposed about the axle 24 and bearing against the respective hubs 26 of the wheels 21. A plurality of lugs 27 alternately project laterally from the opposite side faces 28 and 29 of the discs 22 adjacent the peripheral edges thereof.

A plurality of trailing arms 30 extend rearwardly and transversely from the tow bar 11. Each arm 30 is secured at its forward end to a selected sleeve 12 and at its opposite end to a selected roller bearing 25. A stop bar 31 is positioned forwardly of the tow bar 11 with its longitudinal axis substantially parallel to the longitudinal axis of the tow bar 11 and is fast with the upper surfaces of the arms 16.

In operation, the land packer is towed behind a towing vehicle to which it is connected by the pin and eye hitching joint 17. The packing members 23 are individually free to rise and fall with the contours of the land being packed because the sleeves 12, to which the forward ends of the trailing arms 30 are secured, are rotatable about the shaft 13. The packing wheels 21 normally rotate in unison but a sufficient restraint imposed on one of the wheels 21 of a packing member such as would occur when the packer is turned through a sharp angle, will overcome the friction between the roller bearing 25 and the hub 26 of that wheel so that the wheels 21 of that packing member will turn independently of each other. This results in proper packing during turns and largely avoids dragging on the inside of the turn such as would occur if an elongated cylindrical packer was used.

For transportation purposes the packing members can be elevated as shown in FIGURE 3. The trailing arms 30 rest against the stop bar 31 at an angle sufficiently less than 90° with the plane of the arms 16 so that gravitational pull on the packing members will retain them in elevated position while the packer is being towed from one place to another.

A locking device 32 is included in this embodiment of the invention to hold the packing members 23 in elevated position while the land packer is being moved from one location to another over pavement to prevent damage to the packing members which might occur if one or more of them were bounced out of elevated position and fell backwards against the pavement. The locking device 32 comprises three supports 33 each of which is fast at one end with the stop bar 31 extending upwardly and rearwardly therefrom. Each of the supports 33 is provided with an aperture 34 (see FIGURE 2) adapted to receive the shaft 35 of a locking pin 36. The locking pin 36 has an angled portion 37 at one end and an aperture (not shown) adjacent its other end adapted to receive the pin 38.

The packer can be adapted so that several of them can be hitched to the same towing vehicle for a gang packing operation and so that the several packers can be towed in tandem from one place to another. It will be seen that a larger number of packing members, than is shown in the figures, can be accommodated on a packer by increasing the length of the shaft 13. Similarly, fewer packing members can be employed by using a shorter shaft 13 or by providing intermediate positions along the shaft 13 where end sleeve portions 14 can be secured.

I claim:

1. A land packer comprising a towing frame mounted on a pair of supporting wheels, and a plurality of packing wheels located rearwardly of the frame, said frame including a tow bar and a stop bar, said packing wheels being associated in pairs, each of said pairs of packing wheels being mounted for rotation about an associated axle in spaced apart relationship on an axis substantially parallel to the axis of the tow bar, each of said axles being connected to a trailing arm extending rearwardly and transversely from said tow bar, a sleeve portion circumscribing the tow bar being associated with each of said trailing arms thereby adapting each of the said pairs of packing wheels for pivotal movement about the longitudinal axis of the tow bar independently of the other pairs of packing wheels, each of said packing wheels having a plurality of laterally projecting lugs which alternately project from the opposite side faces of said packing wheels adjacent the peripheral edges thereof, said stop bar being positioned forwardly of the tow bar to limit the extent to which each trailing arm is upwardly pivotable about the tow bar to a predetermined point beyond the vertical, at which point gravitational pull on a pair of packing wheels so elevated, readily retains such pair of packing wheels in such elevated position.

2. A land packer according to claim 1 in which the packing wheels of each associated pair of packing wheels are maintained in spaced apart relationship by a roller bearing positioned therebetween.

3. A land packer according to claim 1 in which each packing wheel of each of said pairs of packing wheels is independently mounted for rotation about its associated axle.

4. A land packer comprising a towing frame mounted on a pair of supporting wheels, and a plurality of packing wheels located rearwardly of the frame, said frame including a tow bar, a stop bar and a locking pin, said packing wheels being associated in pairs, each of said pairs of packing wheels being mounted for rotation about an associated axle in spaced apart relationship on an axis substantially parallel to the axis of the tow bar, each of said axles being connected to a trailing arm extending rearwardly and transversely from said tow bar, a sleeve portion circumscribing the tow bar being associated with each of said trailing arms thereby adapting each of the said pairs of packing wheels for pivotal movement about the longitudinal axis of the tow bar independently of the other pairs of packing wheels, each of said packing wheels having a plurality of laterally projecting lugs which alternately project from the opposite side faces of said packing wheels adjacent the peripheral edges thereof, said stop bar being adapted to bear against the upper surfaces of the trailing arms when the trailing arms are in elevated position and said locking pin being adapted to be placed in operative locking position adjacent the lower surfaces of the trailing arms when the trailing arms are in elevated position.

5. A land packer comprising a towing frame mounted on a pair of supporting wheels, said frame including a tow bar, a plurality of packing members, and means whereby the packing members when raised to an elevated position relative to said frame for transportation purposes are readily retained in such elevated position comprising a stop bar positioned forwardly of the tow bar and having its longitudinal axis substantially parallel to the longitudinal axis of the tow bar, said stop bar being so positioned as to limit the extent to which each trailing arm is upwardly pivotable about the tow bar to a predetermined point beyond the vertical, at which point gravitational pull on a packing member so elevated readily retains it in such elevated position, each of said packing members being rotatably mounted on an axis substantially parallel to the axis of the tow bar on at least one trailing arm extending rearwardly and transversely from said tow bar and being adapted for packing soft ground, a sleeve portion circumscribing the tow bar being associated with each of said trailing arms thereby adapting each of the said packing members for pivotal movement about the longitudinal axis of the tow bar independently of the other packing members.

6. A land packer comprising a towing frame mounted on a pair of supporting wheels, said frame including a tow bar, a plurality of packing members, and means whereby the packing members when raised to an elevated position relative to said frame for transportation purposes are readily retained in such elevated position comprising a stop bar and a locking pin, said stop bar being adapted to bear against the upper surfaces of the trailing arms when the trailing arms are in elevated position and said locking pin being adapted to be placed in operative locking position adjacent the lower surfaces of the trailing arms when the trailing arms are in elevated position, each of said packing members being rotatably mounted on an axis substantially parallel to the axis of the tow bar on at least one trailing arm extending rearwardly and transversely from said tow bar and being adapted for packing soft ground, a sleeve portion circumscribing the tow bar being associated with each of said trailing arms thereby adapting each of the said packing members for pivotal movement about the longitudinal axis of the tow bar independently of the other packing members.

References Cited by the Examiner

UNITED STATES PATENTS

| 532,689 | 1/95 | McColm | 172—548 |
|---|---|---|---|
| 897,057 | 8/08 | Brooks | 172—540 X |
| 1,073,827 | 9/13 | Waite | 172—574 |
| 2,640,307 | 6/53 | Robertson | 172—581 X |
| 2,640,308 | 6/53 | Kranick | 172—568 |

SAMUEL KOREN, *Primary Examiner.*

A. JOSEPH GOLDBERG, *Examiner.*